Oct. 24, 1967    J. A. SINCLAIR ET AL    3,348,614
HYDRATE PREVENTION IN GAS PRODUCTION
Filed June 23, 1965
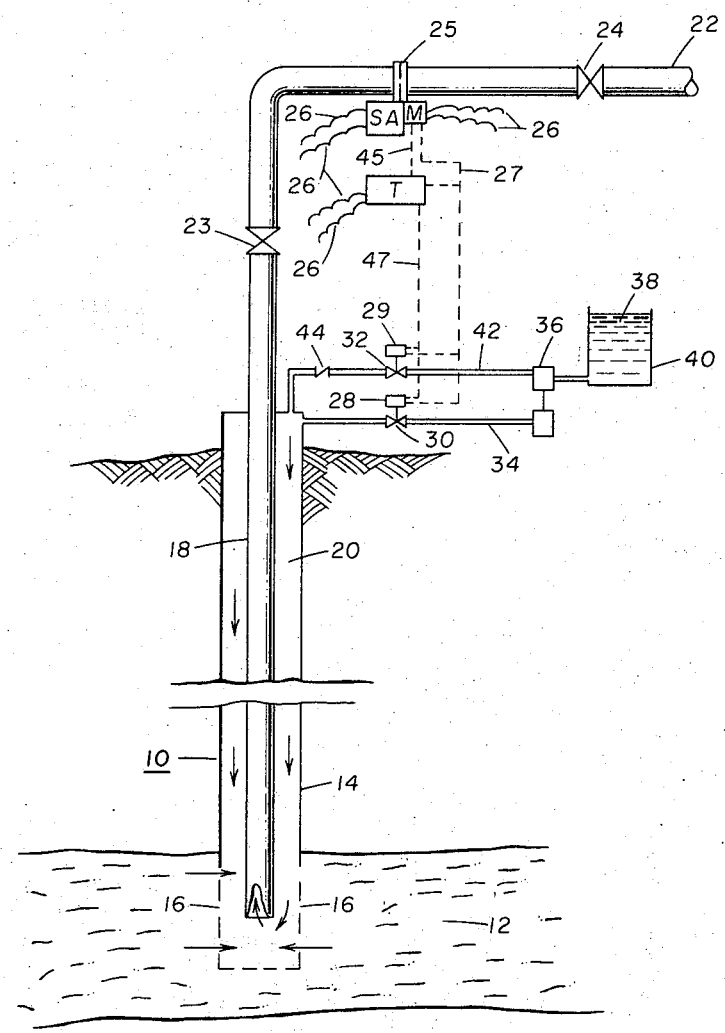
JAMES A. SINCLAIR
ROBERT A. FAIR
INVENTORS
BY James C. Fails
AGENT

3,348,614
HYDRATE PREVENTION IN GAS PRODUCTION
James A. Sinclair and Robert A. Fair, Casper, Wyo., assignors to Mobil Oil Corporation, a corporation of New York
Filed June 23, 1965, Ser. No. 466,147
6 Claims. (Cl. 166—45)

ABSTRACT OF THE DISCLOSURE

This specification discloses a method of injecting a freezing point depressant through an annulus into a well through which gas is being flowed from a subterranean formation to the surface under conditions conducive to formation of hydrates. Particularly, the freezing point depressant is injected during gas production and for a predetermined time interval after natural gas production has been stopped to provide within the well a finite body of freezing point depressant. Upon subsequent production, the freezing point depressant will commingle immediately with the gas and prevent formation of hydrates during initial production when the pressure differentials and the temperature gradients may be most severe. Suitable freezing point depressants include methanol, ethylene glycol, diethylene glycol, or triethylene glycol.

---

This invention relates to producing natural gas from subterranean formations. More particularly, it relates to producing natural gas under conditions where the formation of hydrates in the natural gas creates problems.

Gas wells are drilled into subterranean formations to produce natural gas trapped in such subterranean formations. The gas wells generally are completed with tubing inside of a wellbore or casing. Regardless of whether the well has a casing, an annular space is provided around the tubing. In many wells, this annular space extends from the formation to the top of the well. In the production of the gas, the gas passes from the formation across the annular space and into the tubing. The gas then passes upward through the tubing to a surface conduit.

Often the gas passing from the formation to the surface conduit undergoes a reduction in temperature. This temperature reduction may be due to the gas passing through a portion of the well which is at a low temperature. This low temperature may occur where there is a very cold surface temperature and thus a steeply dipping thermal gradient in the upper subterranean formations through which the well passes. This low temperature may also occur where the gas well is on the edge of a mountainous area and melting snow pours cold water through a subterranean formation through which the well passes. The low temperature may also occur as a result of a large pressure reduction in the gas as it passes to the surface, for example, where the gas passes through a downhole pressure regulator.

Upon reduction in temperature of the natural gas, hydrates are capable of forming. Depending upon the pressure of the gas, the hydrates may form at temperatures well above the freezing point of water. Thus, at 1000 pounds per square inch, hydrates may form at a temperature of 61° F. with 0.6 specific gravity gas. These hydrates are crystals, analogous to ice crystals, of water in combination with a liquefiable component of the gas stream. The formation of these hydrates presents a problem in that they can effect a solid blockage to flow of the gas at the points where they form and accumulate. Thus, where the natural gas becomes reduced in temperature in its passage from the formation to the surface conduit, hydrates may form with consequent blockage to the flow of the gas.

Normal production of natural gas from a well frequently involves temporary shutting in of the well. For example, the well may be shut in temporarily for the purpose of avoiding production in excess of state allowables. The problem of the formation of hydrates is particularly severe when production of natural gas is started from a well which has been shut in. The pressure within the shut-in gas well will reach equilibrium with the pressure in the subterranean formation, and this pressure will be higher than the flowing pressure of the well. The pressure drop into the surface conduit on start up will, therefore, be greater than in normal production, engendering greater cooling and thus lower temperatures. Further, the gas will be cooler having attained temperature equilibrium with its environment within the well.

There are several ways to prevent the formation of hydrates. A particular way of preventing hydrates is to inject a freezing point depressant into the natural gas stream. Further, the freezing point depressant not only prevents the formation of hydrates but serves to melt them if they should have formed.

Injection of a freezing point depressant can be effected through a third string of pipe, commonly termed spaghetti string, into the tubing. For purposes of economy, the spaghetti string extends to the minimum depth that hydrate is expected to occur. However, because the temperatures vary with depth and with the season, for example, as a result of water from melting snow cooling a formation through which the well passes, the spaghetti string may not have been positioned within the well below the point at which hydrates form. Further, the installation of spaghetti string involves a considerable expense of installation, not only the cost of the extra pipe, but also the difficulty of simultaneously installing the tubing along with the spaghetti string.

Accordingly, it is an object of the invention to provide a method of producing natural gas, under conditions otherwise conductive to formation of hydrates, without forming hydrates.

It is another object of the invention to prevent formation of hydrates within a gas well penetrating a subterrenean formation when producing natural gas therethrough.

It is another object of the invention to prevent formation of hydrates within a gas well penetrating subterranean formations without adding equipment to, or reworking, the well.

It is a particular object of the invention to alleviate the problem of hydrate formation during the start of production of natural gas from a gas well which has been shut in.

Further objects and attendant advantages of the invention will be apparent from the following detailed description taken in conjunction with the accompanying drawing in which:

The figure is an elevation and schematic view of a gas well in which is employed the method of the invention.

In accordance with the invention, a freezing point depressant is injected into the annular space of a natural gas well continuously during production of gas from the well. The freezing point depressant flows down the annulus and commingles with natural gas flowing from the subterranean formation across the annular space into the tubing and thence with the natural gas to the surface conduit. Thus, the natural gas throughout its entire passage through the tubing is admixed with the freezing point depressant, and hydrate formation at all points in the tubing is prevented. In accordance with a specific embodiment of the invention, where the well is shut in temporarily, injection of freezing point depressant is continued for a predetermined period of time after production is discontinued whereby a supply of freezing point depressant is available within the well for commingling with the natural gas therein when production from the well is started.

The freezing point depressant employed may be any of the known materials. Preferably, it is liquid. Methanol, ethylene glycol, diethylene glycol, or triethylene glycol may be employed. Methanol is preferred because of its relatively higher vapor pressure and its lower cost. The latter is particularly significant when no central gathering and regenerating facility is employed to recover the freezing point depressant for reuse.

The freezing point depressant is injected into the well in amounts sufficient to prevent formation of hydrates. The amount per unit volume of gas employed while the well is producing will depend upon the pressure of the gas, the composition of the gas, and the lowest temperature which the gas will attain. These amounts are well known in the art. For example, the amounts of various freezing point depressants required to prevent hydrate formation at various pressures with various gas compositions can be obtained from the following references:

Hammerschmidt, E. G.: Industrial Engineering Chemistry, 26, pp. 851–855 (1934);

Jacoby, R. H.: Gas, 31, No. 2, pp. 112–114 (1955) [Chemical Abstracts 49:4970f]; and Scauzillo, Frank R.: Chemical Engineering Progress, 52, No. 8, pp. 324–328 (August 1956).

In any case, the amount to be employed per unit volume of gas may be determined empirically.

Where the well is temporarily shut in, the freezing point depressant is injected into the well for a period of time after shut in to provide within the well a finite body of freezing point depressant in the liquid state. With a body of freezing point depressant in the liquid state within the well, freezing point depressant will be available to commingle immediately with the natural gas upon beginning of production. From an operational standpoint, the freezing point depressant may be injected into the well for a period of time after shut in such that the amount injected is equal to the amount injected during a 24-hour period of gas production. During the period of injection after shut in, the rate of injection may be equal to, greater than, or less than the rate of injection during gas production. If the rate is greater than or less than the rate during gas production, the time of injection after shut in will be correspondingly lessened or increased, respectively, to effect injection of the same amount of freezing point depressant. For example, if the rate of injection is decreased to one-half the injection rate during normal production, the injection is continued for 48 hours instead of 24 hours.

The injection means employed may be any of the known injectors or pumps. These may be operated by electricity or by the natural gas. Because of the desirability of continued injection regardless of electric power failure, it is preferred to employ injectors or pumps operated by the natural gas.

The following detailed description will further illustrate the invention. Referring to the figure, gas well 10 is completed in subterranean formation 12 containing natural gas at an elevated pressure. Well 10 is conventionally cased with casing 14 having perforations 16 leading into subterranean formation 12. Tubing 18 is suspended within casing 14 and provides an annulus 20 communicating with the subterranean formation and the tubing. This tubing leads into surface conduit 22. Manually operated valves 23 and 24 are provided in conduit 22. Normally, valves 23 and 24 are open. Multiple-orifice valve 25 in conduit 22 is actuatable to control or stop the production of natural gas from tubing 18 into surface conduit 22. Stepping actuator SA actuates the multiple-orifice valve 25 to align across the path of flow of the gas in the valve a plate having a blind section to prevent flow of gas and having a section provided with multiple-sized orifices to control the rate of flow in response to a suitable control function, e.g., a signal from a remote point to control flow of gas. Power for the stepping actuator SA, microswitch M, and timer T is supplied via electric power lines 26. When stepping actuator SA moves the orifice plate from the shut-in position, i.e., where the blind section of the plate prevents flow, microswitch M is released. Microswitch M has front and back contacts and is connected to power lines 26 and, via conductors (shown herein as a dotted control loop for simplicity) 27, to timer T and reversible motors 28 and 29. Releasing microswitch M effects resetting and stopping timer T, if running, or signaling reversible motors 28 and 29 to open valves 30 and 32, if closed. Motors 28 and 29 operate to position valves 30 and 32 fully opened or fully closed in response only to the appropriate signal from timer T or microswitch M. The appropriate signal is determined by each respective limit switch on the open position or the closed position. Position of the valves thus is not changed by power failure. Valve 30 allows natural gas to flow from annulus 20 through line 34 to gas-powered pump 36. Pump 36 takes methanol 38 from reservoir 40 and injects it via line 42, valve 32, and check valve 44 into annulus 20. The methanol flows down annulus 20 and commingles with the natural gas flowing from subterranean formation 12 into tubing 18. As long as natural gas is produced through tubing 18 and multiple-orifice valve 25, methanol is continuously injected into annulus 20.

When stepping actuator SA closes multiple-orifice valve 25, the microswitch M is depressed, closing back contacts and actuating timer T via conductors 45. Timer T is connected via conductors 47 to motors 28 and 29, which control valves 30 and 32. Thus, closing of valves 30 and 32 is prevented for a predetermined time interval during which the methanol is continuously injected into the annulus 20. At the expiration of the preset time interval, timer T signals motors 28 and 29 to close valves 30 and 32, stopping the injection of methanol. Timer T also resets itself and shuts itself off at the expiration of the timing interval. As noted hereinbefore, in the event the microswitch M is released such as by starting production again before expiration of the time interval, the timer is reset and is stopped. In such latter event, however, the expiration of the preset time interval does not occur, and the valves 30 and 32 remain open.

Thus, a complete cycle has been illustrated. The natural gas in tubing 18 contains methanol and is resistant to the formation of hydrates. Further, there is an accumulation of methanol at the bottom of annulus 20 which will be produced to further inhibit the formation of hydrates or to melt hydrates which may form after production is started again.

The injection of freezing point depressant may be discontinued as soon as the well is shut in where there are no severe hydrate problems on resuming production. Referring to components in the figure to illustrate such a case, the timer T may be omitted, and conductors 47 may be connected directly to conductors 45. Thus, when the microswitch M is depressed by the closing of multiple-orifice valve 25 shutting in the well, the front contacts open and the back contacts close, signaling reversible motors 28 and 29 to close valves 30 and 32, stopping the injection of methanol. Upon resumption of production, microswitch M is released, opening back contacts and closing front contacts. This signals reversible motors 29 and 30 to open valves 30 and 32, starting the injection of methanol, and completing a cycle of operation.

Although the invention has been described with a high degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In a process for the production of natural gas to a surface conduit from a subterranean formation through tubing contained in a well, said well leading from said formation to the surface of the earth and having a continuous annular space about said tubing, in which process said natural gas passes to said tubing from said subterranean formation across said annular space, said natural gas is produced at intervals from said formation and between said intervals said well is shut in, and said natural gas contains water and encounters through its passage from said formation across said annular space and through said tubing to said surface conduit a reduction in temperature whereby natural gas hydrates form to effect plugging of flow of said natural gas, the steps comprising injecting a freezing point depressant into said annular space during production of said natural gas to contact said natural gas, said freezing point depressant being injected in an amount sufficient to prevent formation of natural gas hydrates in said natural gas, producing said freezing point depressant along with said natural gas, and continuing injection of said freezing point depressant into said annular space for a predetermined period of time after production of said natural gas is discontinued to form a reservoir of freezing point depressant in said well whereby said freezing point depressant is available for contact with and prevention of natural gas hydrates upon subsequent production of said natural gas.

2. The process of claim 1 wherein said freezing point depressant is methanol, ethylene glycol, diethylene glycol, or triethylene glycol.

3. The process of claim 1 wherein said freezing point depressant is methanol.

4. The process of claim 1 wherein said injection of said freezing point depressant is continued for a period of twenty-four hourn at the same rate of injection employed during production of natural gas.

5. The process of claim 1 wherein natural gas from said continuous annular space is employed to power injectors injecting said freezing point depressant for said predetermined period of time after production of said natural gas is discontinued through said tubing.

6. A method of producing gas from a subterranean formation comprising:
   (a) completing a gas well from the surface of the earth into said subterranean formation having a casing with perforations leading into said subterranean formation and having tubing suspended within said casing to provide a continuous annular space communicating with said subterranean formation and said tubing, across which gas from said subterranean formation must flow to be produced through said tubing,
   (b) providing conduit communicating with said tubing and containing a multiple-orifice valve actuatable to control production of natural gas,
   (c) connecting a stepping actuator to said multiple-orifice valve to actuate said multiple-orifice valve to align the desired flow-controlling section therein to control flow through said conduit and hence through said tubing in response to suitable control functions,
   (d) mounting a microswitch adjacent said stepping actuator,
   (e) connecting a timer to said microswitch,
   (f) connecting a source of freezing point depressant with a pump and connecting said pump through a motor-operated valve to said annular space,
   (g) connecting the power end of said pump through a second motor-operated valve and conduit to said annular space whereby gas pressure in said annular space supplies power to operate said pump when said second motor-operated valve is open,
   (h) connecting said motor-operated valve and said second motor-operated valve to said microswitch and to said timer,
   (i) supplying electrical power to said stepping actuator, said microswitch, and said timer,
   (j) imparting a starting control function to start a cycle and to step said stepping actuator thereby opening said multiple-orifice valve to start flow of gas through said tubing, releasing said microswitch, resetting and stopping said timer when running, effecting opening of said motor-operated valve and said second motor-operated valve, and pumping freezing point depressant into said annular space to be admixed with said gas and to be produced through said tubing,
   (k) preventing the repositioning of said valves or said stepping actuator when power temporarily fails,
   (l) subsequently applying a stopping control function to step said stepping actuator, closing said multiple-orifice valve to stop said flow of gas, depressing said microswitch, and actuating said timer,
   (m) continuing to pump freezing point depressant until expiration of said preset predetermined time interval in said timer, thereupon closing said valves, and resetting and shutting off said timer, and
   (n) imparting a starting control function to repeat said cycle and start flow of gas containing premixed therewith said freezing point depressant which was continuously injected for said predetermined time interval after cessation of production of said natural gas.

References Cited

UNITED STATES PATENTS

| | | | |
|---|---|---|---|
| 2,801,697 | 8/1957 | Rohrback | 166—1 |
| 3,191,681 | 6/1965 | Hubby | 166—45 X |
| 3,259,185 | 7/1966 | Gates | 166—11 |

OTHER REFERENCES

Petroleum, Production Engineering, 3rd Ed. by Uren, © 1953, McGraw-Hill Book Co., pp. 600–602 relied on, copy in Group 350.

The Oil and Gas Journal, vol. 65, No. 6, Feb. 6, 1967, pp. 81–86, copy in 166/41.

CHARLES E. O'CONNELL, *Primary Examiner.*

NILE C. BYERS, *Examiner.*